US012620328B2

(12) United States Patent
Kwon et al.

(10) Patent No.: US 12,620,328 B2
(45) Date of Patent: May 5, 2026

(54) SOURCE DRIVER REDUCING TEST TIME BY SIMULTANEOUSLY PERFORMING TEST ON THE SOURCE DRIVER AND DISPLAY DRIVER INTEGRATED CIRCUIT INCLUDING THE SAME

(71) Applicant: SAMSUNG ELECTRONICS CO., LTD., Suwon-si (KR)

(72) Inventors: Taek Su Kwon, Suwon-si (KR); In-Suk Kim, Suwon-si (KR); Jeeyeon Eom, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 18/806,435

(22) Filed: Aug. 15, 2024

(65) Prior Publication Data

US 2025/0201156 A1 Jun. 19, 2025

(30) Foreign Application Priority Data

Dec. 19, 2023 (KR) ........................ 10-2023-0185969

(51) Int. Cl.
*G09G 3/36* (2006.01)
*G09G 3/00* (2006.01)
(Continued)

(52) U.S. Cl.
CPC ........... *G09G 3/006* (2013.01); *G09G 3/3275* (2013.01); *G09G 3/3688* (2013.01);
(Continued)

(58) Field of Classification Search
CPC ........ G09G 3/36; G09G 3/3611; G09G 3/314; G09G 3/3622; G09G 3/3625; G09G 3/3633; G09G 3/364; G09G 3/3644; G09G 3/3648; G09G 3/3685; G09G 3/3688; G09G 3/3692; G09G 3/3696; G09G 3/3614
(Continued)

(56) References Cited

U.S. PATENT DOCUMENTS 8,810,268 B2 8/2014 Huang et al.
9,530,338 B2 12/2016 Huang et al.
(Continued)

FOREIGN PATENT DOCUMENTS

JP 7161435 10/2022

*Primary Examiner* — Ke Xiao
*Assistant Examiner* — Nelson Lam
(74) *Attorney, Agent, or Firm* — Fish & Richardson P.C.

(57) ABSTRACT

A display driving integrated circuit includes: a gamma voltage generator outputs a plurality of gamma voltages at a first voltage level based on a first control signal in a first time period among a plurality of time periods, outputs a plurality of gamma voltages at a second voltage level based on a second control signal in a second time period among the plurality of time periods, and outputs a reference voltage that swings between a third voltage level lower than the first voltage level and a fourth voltage level higher than the second voltage level in the plurality of time periods; and a source block circuit receives input data in response to a first clock signal in the first time period, selects a first gamma voltage among the plurality of gamma voltages of the first voltage level based on the input data, and compares the first gamma voltage and the reference voltage.

20 Claims, 13 Drawing Sheets

(51) Int. Cl.
*G09G 3/3275* (2016.01)
*G09G 3/3233* (2016.01)

(52) U.S. Cl.
CPC ......... *G09G 3/3696* (2013.01); *G09G 3/3233* (2013.01); *G09G 2310/0286* (2013.01); *G09G 2310/0289* (2013.01); *G09G 2330/028* (2013.01)

(58) Field of Classification Search
USPC .................................................... 345/87–104
See application file for complete search history.

(56) References Cited

U.S. PATENT DOCUMENTS

| | | | | |
|---|---|---|---|---|
| 10,600,698 | B2 | 3/2020 | Masai | |
| 10,818,208 | B2 | 10/2020 | Yen | |
| 11,521,526 | B2 | 12/2022 | Nohtomi et al. | |
| 2003/0030631 | A1* | 2/2003 | Chen | G09G 3/3696 345/88 |
| 2009/0184730 | A1 | 7/2009 | Chen et al. | |
| 2010/0052964 | A1* | 3/2010 | Lee | G09G 3/3696 341/144 |
| 2012/0206506 | A1* | 8/2012 | Kim | G09G 3/20 345/690 |
| 2013/0249969 | A1* | 9/2013 | Jeon | G09G 3/3685 345/99 |
| 2013/0271682 | A1* | 10/2013 | Liou | G09G 3/3659 349/41 |
| 2014/0198090 | A1* | 7/2014 | Park | G09G 3/3233 345/82 |
| 2015/0310812 | A1* | 10/2015 | Chen | G09G 3/20 345/96 |
| 2017/0162108 | A1* | 6/2017 | Jo | G09G 3/2092 |
| 2020/0005723 | A1* | 1/2020 | Kim | G09G 3/3696 |
| 2021/0012743 | A1* | 1/2021 | Lee | G09G 3/3685 |
| 2021/0043123 | A1* | 2/2021 | Lee | G09G 3/20 |
| 2021/0201755 | A1* | 7/2021 | Park | G09G 3/2007 |
| 2023/0063319 | A1* | 3/2023 | Kim | G09G 3/20 |
| 2023/0252956 | A1* | 8/2023 | Kim | G09G 5/10 345/204 |
| 2023/0368719 | A1* | 11/2023 | Lee | G09G 3/2011 |
| 2025/0292717 | A1* | 9/2025 | Liu | G09G 3/2096 |

* cited by examiner

100

SOURCE DRIVER REDUCING TEST TIME BY SIMULTANEOUSLY PERFORMING TEST ON THE SOURCE DRIVER AND DISPLAY DRIVER INTEGRATED CIRCUIT INCLUDING THE SAME

CROSS-REFERENCE TO RELATED APPLICATION

This application claims priority to and the benefit of Korean Patent Application No. 10-2023-0185969 filed in the Korean Intellectual Property Office on Dec. 19, 2023, the entire content of which is incorporated herein by reference.

BACKGROUND

Generally, a display panel provides various visual information to a user by displaying an image. The display panel includes a plurality of pixels, and each of the plurality of pixels expresses light of a predetermined luminance to display an image. A display driver integrated circuit (DDI) is used to drive the pixel.

Meanwhile, it is possible to determine whether the DDI is defective through an electrical die sorting (EDS) test, which is one of test processes for wafers. However, as the number of channels in DDI increases, the EDS test time also increases. Therefore, various studies are being actively conducted to reduce the EDS test time.

SUMMARY

The present disclosure relates to a source driver and a display driver integrated circuit including the same.

According to some implementations, a source driver may determine defects in the source driver and a display driver integrated circuit including the same.

According to some implementations, a source driver may reduce a test time by simultaneously performing a test on the source driver and a display driver integrated circuit including the same.

According to some implementations, a display driving integrated circuit includes: a gamma voltage generator-configured to output a plurality of gamma voltages at a first voltage level based on a first control signal in a first time period among a plurality of time periods, output a plurality of gamma voltages at a second voltage level based on a second control signal in a second time period among the plurality of time periods, and output a reference voltage that swings between a third voltage level lower than the first voltage level and a fourth voltage level higher than the second voltage level in the plurality of time periods; and a source block circuit configured to receive input data in response to a first clock signal in the first time period, select a first gamma voltage among the plurality of gamma voltages of the first voltage level based on the input data, and compare the first gamma voltage and the reference voltage.

According to some implementations, a source driver includes: a decoder configured to select a first gamma voltage of a first plurality of gamma voltages based on input data in a first mode and select a second gamma voltage of a second plurality of gamma voltages based on input data in a second mode; a comparator configured to amplify the first gamma voltage in the first mode to generate a data signal corresponding to the input data, and compare the second gamma voltage and a reference voltage in the second mode to generate a comparison signal; and a level shifter configured to shift a level of the comparison signal in the second mode to generates an output signal.

According to some implementations, a display driving integrated circuit includes: a source block circuit configured to receive a plurality of gamma voltages at a maximum gamma voltage level in a first time period, receive input data based on a first clock signal, selects a first gamma voltage of the plurality of gamma voltages at the maximum gamma voltage level based on the input data, compare the first gamma voltage and a reference voltage to generate a first output signal, receive a plurality of gamma voltages at a minimum gamma voltage level in a second time period, select a second gamma voltage of the plurality of gamma voltages at the minimum gamma voltage level based on the input data, and compare the second gamma voltage and the reference voltage to generate a second output signal; a plurality of registers configured to receive the first output signal and the second output signal, detect a voltage level of the first output signal based on a second clock signal that is different from the first clock signal in the first time period, and detect a voltage level of the second output signal based on the second clock signal in the second time period; and a driving controller configured to output the first clock signal and the second clock signal.

DETAILED DESCRIPTION

Figure 1:
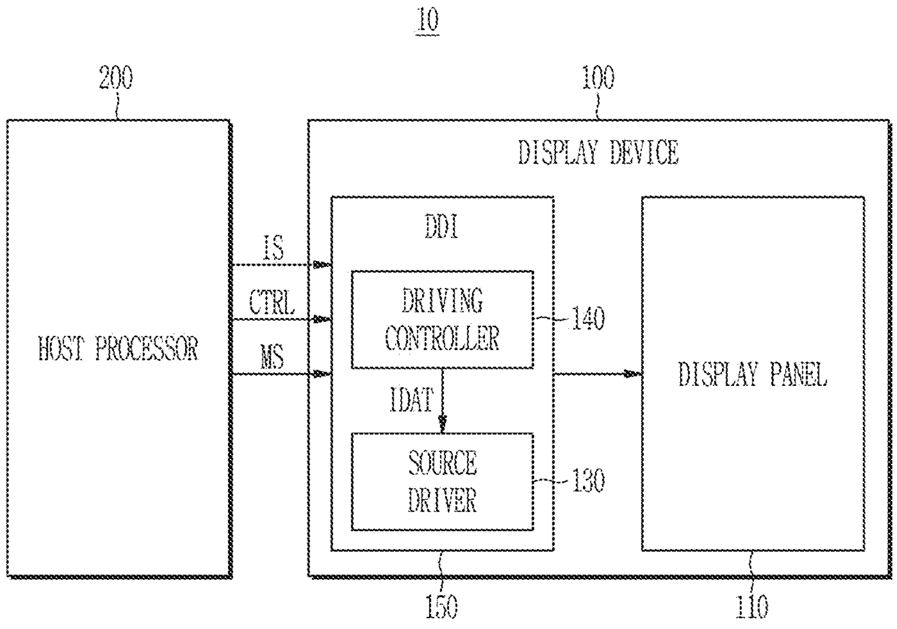
FIG. 1 illustrates a block diagram of a display system according to some implementations.

The present disclosure will be described more fully hereinafter with reference to the accompanying drawings, in which implementations of the disclosure are shown. As those skilled in the art would realize, the described implementations may be modified in various different ways, all without departing from the spirit or scope of the present disclosure.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless an explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

FIG. 1 illustrates a block diagram of a display system according to some implementations.

Referring to FIG. 1, a display system 10 according to some implementations may be mounted on an electronic device having an image display function. For example, the electronic device may include a smartphone, a tablet personal computer (PC), a portable multimedia player (PMP), a camera, a wearable device, a television, a digital video disk (DVD) player, a refrigerator, an air conditioner, an air purifier, a set-top box, a robot, a drone, various medical devices, a navigation device, a global positioning system (GPS) receiver, a vehicle device, furniture, or various measuring devices.

In some implementations, the display system 10 may provide an artificial reality system, for example, a virtual reality (VR) system, an augmented reality (AR) system, a mixed reality (MR) system, a hybrid reality system, or some combination and/or derivative system thereof. The artificial reality system may be implemented on various platforms, including a head mounted display (HMD), a mobile device, a computing system, or other hardware platforms capable of providing artificial reality content to one or more viewers.

The display system 10 includes a display device 100 and a host processor 200. The display device 100 includes a DDI 150 and a display panel 110.

The host processor 200 may generate an input image signal IS to be displayed on the display panel 110 and transmit the input image signal IS and a control command CTRL to the DDI 150. The input image signal IS may include frame data corresponding to each frame. The control command CTRL may include setting information for luminance, gamma, frame frequency, and the like.

The host processor 200 may be a graphics processor. However, the present disclosure is not limited thereto, and the host processor 200 may be implemented with various types of processors such as a central processing unit (CPU), a microprocessor, a multimedia processor, an application processor (AP), an electronic control unit (ECU), and the like. In some implementations, the host processor 100 may be implemented as an integrated circuit (IC) or a system on chip (SoC).

The display device 100 may receive the input image signal IS from the host processor 200, and may display an image based on the input image signal IS. The display device 100 may display a two-dimensional or three-dimensional image to the user. In some implementations, the display device 100 may be a device in which the DDI 150 and the display panel 110 are implemented as one module. For example, the DDI 150 may be mounted on a substrate of the display panel 110, or the DDI 150 and the display panel 110 may be electrically connected through a connection member such as a flexible printed circuit board (FPCB).

The display panel 110 may include a plurality of pixels. The display panel 110 may be one of display devices that display a two-dimensional image by receiving an electrically transmitted image signal, such as a thin film transistor-liquid crystal display (TFT-LCD), an organic light emitting diode (OLED) display, a filed emission display, and a plasma display panel (PDP). In some implementations, there may be one or more display panels 110. For example, two display panels 110 may provide images for respective eyes of the user.

The DDI 150 may generate a plurality of analog signals to drive the display panel 110. For example, the plurality of analog signals may include a gate signal and a data signal that drive a plurality of pixels included in the display panel 110. The DDI 150 may provide the gate signal and the data signal to the plurality of pixels. The display panel 110 may emit corresponding image light by the signal provided by the DDI 150.

The DDI 150 includes a driving controller 140 and a source driver 130. The driving controller 140 may generate image data IDAT to display an image on the display panel 110. The driving controller 140 may provide the image data IDAT to the source driver 130.

In some implementations, the host processor 200 may transmit a mode signal MS to the DDI 150. The source driver 130 of the display device 100 may operate in a first mode or a second mode depending on the mode signal MS. In some implementations, the first mode may be a driving mode of the source driver 130, and the second mode may be a test mode of the source driver 130, but the first and second modes are not limited thereto. In the first mode, for example the driving mode, of the source driver 130, the source driver 130 may generate data signals for the input image signal IS based on the image data IDAT.

The source driver 130 may output abnormal data signals. For example, due to a defect in the source driver 130, the source driver 130 may not be able to output a target signal at a target time. Accordingly, the display panel 110 may output a low-quality image. To prevent and solve the problem, a test operation on the source driver 130 may be performed. In some implementations, based on the mode signal MS transmitted from the host processor 200, the source driver 130 may enter the second mode, for example, the test mode. Alternatively, the source driver 130 may receive a command indicating entry into the test mode from an external test device, or may enter the test mode on its own, but the present disclosure is not limited thereto. In the test mode, the DDI 150 may determine whether the source driver 130 has a defect.

Figure 2:
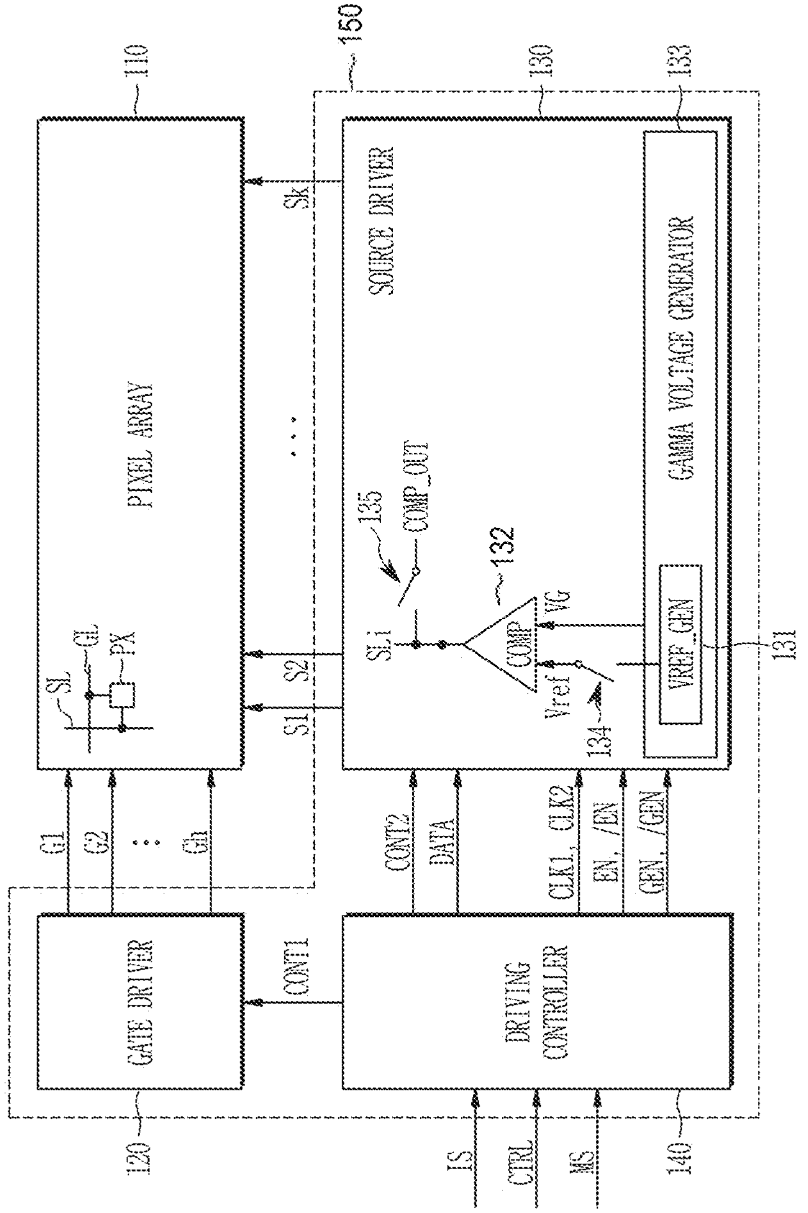
FIG. 2 illustrates an example block diagram of a display device according to some implementations.

FIG. 2 illustrates an example block diagram of a display device according to some implementations.

Referring to FIG. 2, a display device 100 according to some implementations includes a pixel array 110 and a DDI 150, and the DDI 150 includes a gate driver 120, a source driver 130, and a driving controller 140.

A plurality of pixels PX for displaying an image may be positioned in the pixel array 110. The pixel PX may be connected to a corresponding source line SL among a plurality of source lines and a corresponding gate line GL among a plurality of gate lines. The pixel PX may receive a data signal from the source line SL when a gate signal is supplied to the gate line GL. The pixel PX may emit light of a predetermined luminance corresponding to an inputted data signal. The plurality of pixels PX may display an image in units of one frame.

When the display device 100 is an organic light emitting display device, each of the pixels PX may include a plurality of transistors including a driving transistor and an organic light emitting diode. The driving transistor included in the pixel PX may supply a current corresponding to the data signal to the organic light emitting diode, so that the organic light emitting diode may emit light with a predetermined luminance. When the display device 100 is a liquid crystal display device, each of the pixels PX may include a switching transistor and a liquid crystal capacitor. The pixel PX may control transmittance of a liquid crystal in response to the data signal so that light of a predetermined luminance may be supplied to the outside.

Although the pixel PX is illustrated as being connected to one source line SL and one gate line GL in FIG. 2, the connection structure of the signal line of the pixel PX of the display device according to some implementations is limited thereto. For example, various signal lines may be additionally connected to correspond to the circuit structure of the pixel PX. In some implementations, the pixel PX may be implemented in various currently known forms.

The gate driver 120 may provide a plurality of gate signals (G1, G2, . . . , Gh). The plurality of gate signals (G1, G2, . . . , Gh) may be pulse signals having an enable level and a disable level. The plurality of gate signals (G1, G2, . . . , Gh) may be applied to a plurality of gate lines GL. When the gate signal of the enable level is applied to the gate line GL connected to the pixel PX, the data signal applied to the source line SL connected to the pixel PX may be transmitted to the pixel PX. The gate driver 120 may provide a plurality of gate signals (G1, G2, . . . , Gh) during a plurality of horizontal periods. One frame may include the plurality of horizontal periods.

The driving controller 140 may receive the image signal IS and the driving control signal CTRL from the host processor (200 in FIG. 1) and control the gate driver 120 and the source driver 130. In some implementations, the driving controller 140 may further receive the mode signal MS from the host processor 200. The mode signal MS may be a signal instructing to perform a test operation on the source driver 130. Based on the mode signal MS, the source driver 130 may operate in the test mode.

The source driver 130 includes a comparator 132 and a gamma voltage generator 133. Each component included in the source driver 130 is not limited to the example shown in FIG. 2, and additional components may be included in or excluded from the source driver 130. For example, the gamma voltage generator 133 may be separately configured from the source driver 130, and the driving controller 140 may be included in the source driver 130.

In the driving mode of the source driver 130, the source driver 130 may receive data DATA in the form of a digital signal and a first clock signal CLK1 from the driving controller 140, and may convert the data DATA into data signals (S1, S2, . . . , Sk) in the form of an analog signal. The source driver 130 may transmit the corresponding data signal among the plurality of data signals (S1, S2, . . . , Sk) to the source line SLi. The source driver 130 may receive a plurality of gamma voltages VG. The plurality of gamma voltages VG may be supplied by the gamma voltage generator 133. In the driving mode of the source driver 130, the source driver 130 may select at least some of the plurality of gamma voltages VG based on the image data, and the comparator 132 may amplify the selected gamma voltage. The source driver 130 may amplify the gamma voltage to output it as a data signal to the source line SLi. In the driving mode of the source driver 130, the comparator 132 of the source driver 130 may operate as an amplifier.

In the test mode of the source driver 130, the source driver 130 may receive data DATA in the form of a digital signal and a second clock signal CLK2 from the driving controller 140. The second clock signal CLK2 may be enabled at a time delayed by a predetermined time from an enabling time point of the first clock signal CLK1. The time point at which the second clock signal CLK2 is enabled may be a reference time point for determining whether the source driver 130 is defective. The source driver 130 may select at least some of the plurality of gamma voltages VG in response to the input of the data DATA. The source driver 130 may compare the selected gamma voltage and a reference voltage Vref. In the test mode of the source driver 130, the plurality of gamma voltages VG may be a first voltage level or a second voltage level. The comparator 132 may output a comparison result between the gamma voltage and the reference voltage Vref as an output signal COMP_OUT. Based on the voltage level of the output signal COMP_OUT, it may be determined whether the source driver 130 is defective.

In the test mode of the source driver 130, the driving controller 140 may output switch control signals EN, /EN, GEN, and/GEN for controlling the gamma voltage generator 133 and switches 134 and 135 of the source driver 130. The switch control signals EN, /EN, GEN, and /GEN will be described in detail later with reference to FIG. 3 and FIG. 4.

The gamma voltage generator 133 may generate the plurality of gamma voltages VG. In the driving mode of the source driver 130, the plurality of gamma voltages VG may be voltages corresponding to various levels of luminance. In the test mode of the source driver 130, the plurality of gamma voltages VG may be voltages corresponding to the first voltage level or the second voltage level. The gamma voltage generator 133 may determine the number of the plurality of gamma voltages based on the number of bits of image data. For example, when the image data is 8-bit data, the number of the plurality of gamma voltages may be $2^8$ or less, and when the image data is 12-bit data, the number of the plurality of gamma voltages may be $2^{12}$ or less. That is, when the image data is data having N bits, the plurality of gamma voltages may have $2^N$ different magnitudes.

In some implementations, the gamma voltage generator 133 includes a reference voltage generator 131. The reference voltage generator 131 may generate and output the reference voltage Vref. The reference voltage Vref may swing in a range that is lower than the first voltage level and higher than the second voltage level.

The pixel array 110 and the gate driver 120 may be implemented on the same substrate, and the source driver 130 and the driving controller 140 may be configured as one chip. In some implementations, the pixel array 110, the gate driver 120, the source driver 130, and the driving controller 140 may be implemented on the same substrate. In some implementations, the gate driver 120, the source driver 130, and the driving controller 140 may be configured as one chip. The gate driver 120 may be implemented as a separate semiconductor die, chip, or module to be connected to the pixel array 110. In addition, a portion of the gate driver 120 may be disposed on the substrate on which the pixel array 110 is disposed, while the remaining portion may be included in a separate chip.

Figure 3:
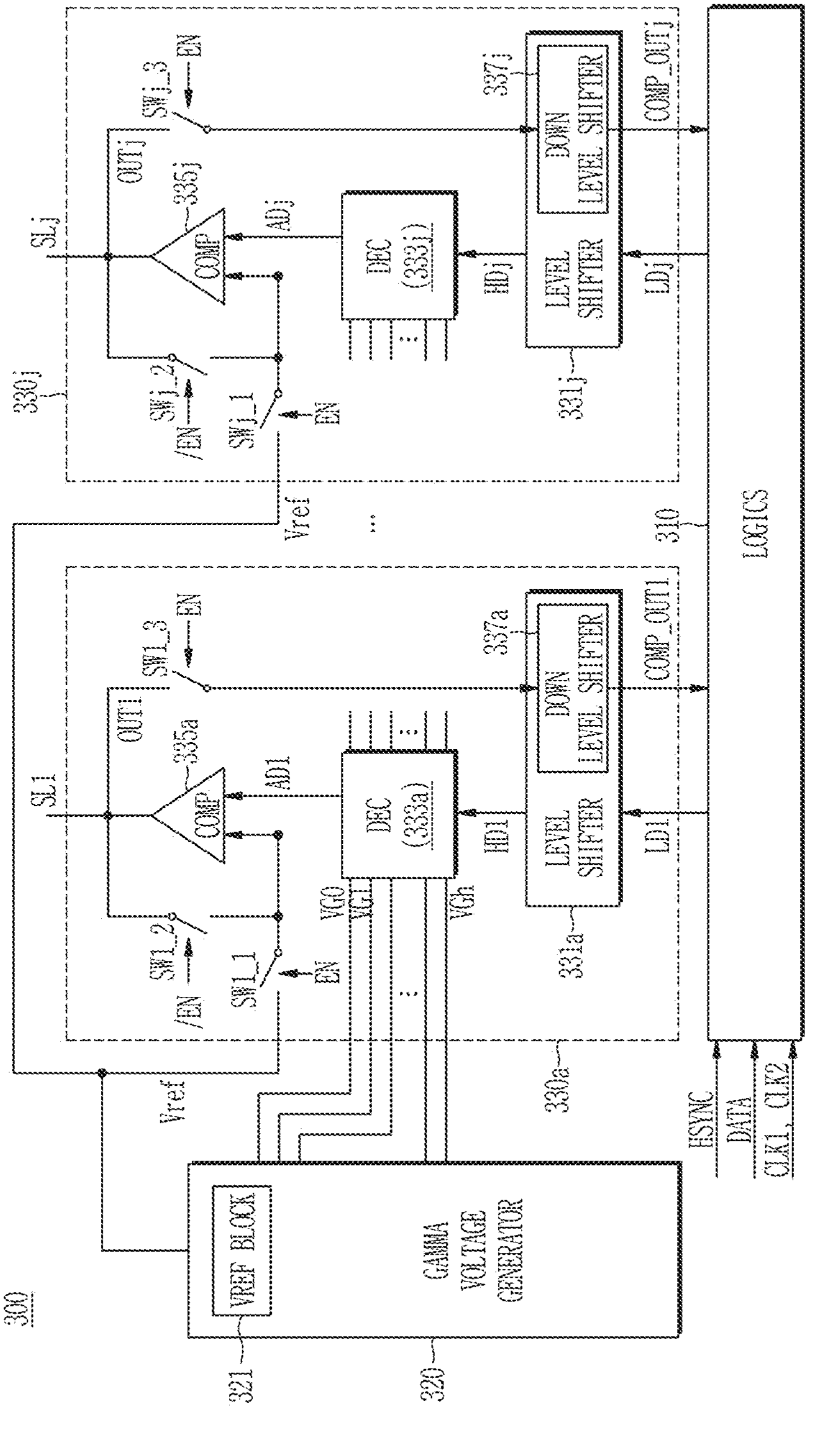
FIG. 3 illustrates a block diagram of a partial configuration of a source driver according to some implementations.

FIG. 3 illustrates a block diagram of a partial configuration of a source driver according to some implementations.

Referring to FIG. 3, a source driver 300 includes a logic 310, a plurality of source blocks (330*a*, . . . , 330*j*), and a gamma voltage generator 320.

In some implementations, the logic 310 may include a plurality of registers. The plurality of registers may refer to shift registers, but are not limited thereto. The logic 310 may sample data DATA in response to a horizontal synchronizing signal HSYNC and/or a first clock signal CLK1, and may provide the sampled image data (LD1, . . . , LDj) to a plurality of source blocks (330*a*, . . . , 330*j*). The first clock signal CLK1 may be generated based on the horizontal synchronizing signal HSYNC. The data DATA includes a plurality of source data corresponding to a plurality of source lines (SL1, . . . , SLj), and each of the plurality of source data may include a plurality of bits. The logic 310 may sample each of the plurality of bits of the data DATA to generate the image data (LD1, . . . , LDj) having a plurality of bits.

In some implementations, the source driver 300 may operate in the test mode. In the test mode of the source driver 300, the logic 310 may receive output data (COMP_OUT1, . . . , COMP_OUTj) from the plurality of source blocks (331*a*, . . . , 331*j*), and may determine whether the source driver 300 is defective in response to the second clock signal CLK2. The second clock signal CLK2 may be enabled at a time delayed by a predetermined time from a time point when the first clock signal CLK1 is enabled. The logic 310 may determine whether the source driver 300 is defective based on the voltage level of the output data (COMP_OUT1, . . . , COMP_OUT2) at the first time point (for example, enable time point) of the second clock signal CLK2.

Each of the plurality of source blocks (330*a*, . . . , 330*j*) includes a level shifter (331*a*, . . . , 331*j*), a decoders (333*a*, . . . , 333*j*), and a comparator (335*a*, . . . , 335*j*). Hereinafter, a description will be made with reference to the source block 330*a* connected to the source line SL1.

The level shifter 331*a* may level-shift the image data LD1. The level shifter 331*a* may receive the image data LD1 of a low voltage level to output decode image data HD1 of a high voltage level to the decoder 333*a*. In some implementations, the image data LD1 may include a plurality of bits, and the level shifter 331*a* may level-shift the plurality of bits of the image data LD1 to generate the decode image data HD1 having a plurality of bits. The level shifter 331*a* may receive the digital signal LD1 to provide the decode image data HD1 whose level has been shifted to swing between target voltage levels to the decoder 333*a*.

The decoder 333*a* may output an analog signal AD1 corresponding to the decode image data HD1. The decoder 333*a* may receive a plurality of gamma voltages (VG0, VG1, . . . , VGh) along with decode image data HD1. The plurality of gamma voltages (VG0, VG1, . . . , VGh) may be supplied by the gamma voltage generator 320 through the gamma line. In the driving mode of the source driver 300, the plurality of gamma voltages VG may be voltages corresponding to various levels of luminance. The decoder 333*a* may select at least some of the plurality of gamma voltages (VG0, VG1, . . . , VGh) based on the decode image data HD1 to transmit it as an input voltage to the comparator 335*a* through an output port.

In the driving mode of the source driver 300, the comparator 335*a* may output the input voltage received from the decoder 333*a* as a data signal to a pixel connected to the corresponding source line SL1. In the driving mode of the source driver 300, the first switch SW1_1 and the third switch SW1_3 may be opened by a switch control signal EN, and the second switch SW1_2 may be closed by an inverted switch control signal /EN. In the driving mode of the source driver 300, the comparator 335*a* may operate as an amplifier.

In some implementations, the source driver 300 may operate in the test mode. In the test mode of the source driver 300, the plurality of gamma voltages VG supplied by the gamma voltage generator 320 may swing between the first voltage level and the second voltage level. The first voltage level may be higher than the second voltage level. In the test mode of the source driver 300, the analog signal AD1 outputted from the decoder 333*a* may be a value selected from the gamma voltages (VG0, . . . , VGh) of the first voltage level or the second voltage level.

In the test mode of the source driver 300, the comparator 335*a* may compare the reference voltage Vref and the analog signal AD1 and output a comparison result. In the test mode of the source driver 300, the first switch SW1_1 and the third switch SW1_3 may be closed by the switch control signal EN, and the second switch SW1_2 may be opened by the inverted switch control signal /EN. The reference voltage Vref may be supplied from the reference voltage block 321 in the gamma voltage generator 320. The reference voltage Vref may swing between a voltage level that is lower than the first voltage level and higher than the second voltage level.

In the test mode of the source driver 300, the comparison result between the reference voltage Vref and the analog signal AD1, which is the gamma voltage VG, may be transmitted to the level shifter 331*a*. The level shifter 331*a* includes a down level shifter 337*a*. The level shifter 331*a* may level-shift the output of the comparator 335*a*, and may output the level shifted output signal COMP_OUT1. The down level shifter 337*a* may receive the output of the comparator 335*a* and output an output signal COMP_OUT1 in the form of a digital signal. The output signal COMP_OUT1 may be transmitted to the logic 310.

In the test mode of the source driver 300, the logic 310 may determine whether the source block 330*a* is defective based on the voltage level of the output signal COMP_OUT1. For example, the logic 310 may determine whether the comparator 335*a*, the decoder 333*a*, and the like are defective based on the voltage level of the output signal COMP_OUT1. A specific method of determining whether the source block 330*a* is defective will be described later with reference to the timing diagram of FIG. 5.

Figure 4:
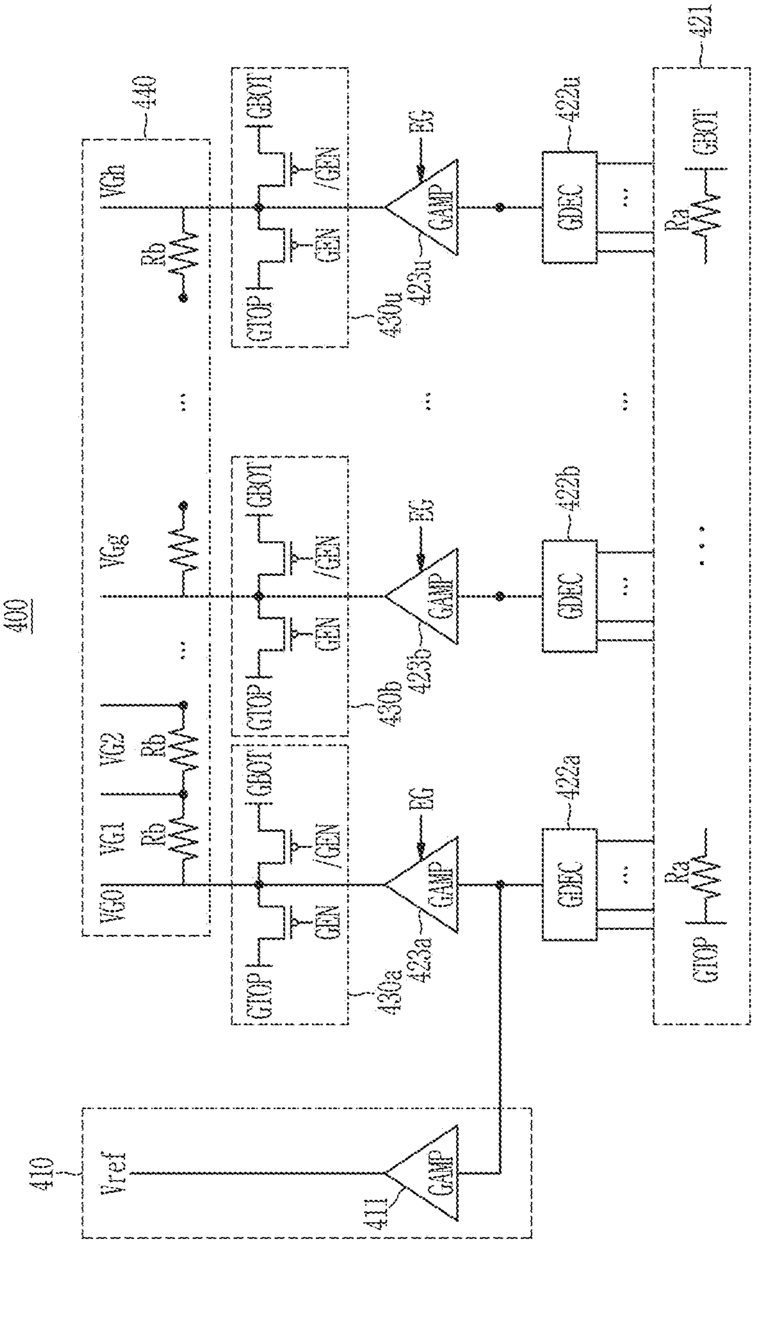
FIG. 4 illustrates an example block diagram of a gamma voltage generator according to some implementations.

FIG. 4 illustrates an example block diagram of a gamma voltage generator according to some implementations.

A gamma voltage generator 400 includes a reference voltage block 410, a first resistor string 421, a plurality of gamma decoders (422*a*, 422*b*, . . . , 422*u*), a plurality of gamma amplifiers (423*a*, 423*b*, . . . , 423*u*), a plurality of gamma switches (430*a*, 430*b*, . . . , 430*u*), and a second resistor string 440. The gamma voltage generator 400 may determine the number of the plurality of gamma voltages (VG0, VG1, . . . , VGh) based on the number of bits of the decode image data (HD1 in FIG. 3). For example, when the decode image data HD1 is 8-bit data, the number of the plurality of gamma voltages (VG0, VG1, . . . , VGh) may be $2^8$ or less, and when the decode image data HD1 is 10-bit data, the number of the plurality of gamma voltages (VG0, VG1, . . . , VGh) may be $2^{10}$ or less. That is, when the decode image data HD1 is N-bit data, the plurality of gamma voltages (VG0, VG1, . . . , VGh) may have $2^N$ different magnitudes.

In the driving mode of the source driver (300 in FIG. 3), the gamma voltage generator 400 may determine the magnitude of each of the plurality of gamma voltages (VG0, VG1, . . . , VGh) based on the operating condition of the display device 100 or the gamma register setting. Specifically, the first resistor string 421 may set the range of the gamma voltages (VG0, . . . , VGh). The first resistor string 421 includes a plurality of first resistors Ra connected in series between a maximum gamma voltage GTOP and a minimum gamma voltage GBOT. A voltage between the maximum and minimum gamma voltages GTOP and GBOT may be divided into a plurality of reference gamma voltages by the plurality of first resistors Ra. The plurality of first resistors Ra may have the same resistance value. The maximum gamma voltage GTOP may be a maximum voltage that the gamma voltages (VG0, . . . , VGh) may have, the minimum gamma voltage GBOT may be a minimum voltage that the gamma voltages (VG0, . . . , VGh) may have, and each of the maximum and minimum gamma voltages GTOP and GBOT may be set based on a driving voltage (or a power voltage) applied to the gamma voltage generator 420.

The gamma decoder 422*a* may select one of the reference gamma voltages divided by the first resistor string 421. Similarly, the gamma decoders (422*b*, . . . , 422*u*) may select one of the reference gamma voltages divided by the first resistor string 421. Each of the plurality of gamma decoders (422*a*, . . . , 422*u*) may receive a gamma selection signal. The gamma selection signal may be provided from the driving controller 140. Each of the plurality of gamma decoders (422*a*, . . . , 422*u*) may output one reference gamma voltage selected based on the gamma selection signal among the inputted reference gamma voltages.

In the driving mode of the source driver 300, the gamma amplifier 423*a* may output one selected by the gamma decoder 422*a* among the reference gamma voltages divided by the first resistor string 421. Similarly, the gamma amplifiers (423*b*, . . . , 423*u*) may output voltages selected by the gamma decoders (422*b*, . . . , 422*u*) among the reference gamma voltages divided by the first resistor string 421, respectively. The plurality of gamma amplifiers (423*a*, 423*b*, . . . , 423*u*) may be connected to a second resistor string 424. The second resistor string 424 includes a plurality of second resistors Rb. The plurality of second resistors Rb may have the same resistance value. In the driving mode of the source driver 300, the gamma voltage generator 400 may generate gamma voltages (VG0, VG1, . . . , VGh) within a gamma voltage range set in the first resistor string 421. The gamma voltages (VG0, VG1, . . . , VGh) may be provided to the decoders (333*a*, . . . , 333*j* in FIG. 3) through the gamma line.

In the driving mode of the source driver 300, all of the gamma switches (430*a*, . . . , 430*u*) may be opened. The gamma switches 430 may be controlled by the gamma switch control signals GEN and/GEN.

In the test mode of the source driver 300, the gamma voltage generator 400 may receive the gamma control signal EG from the driving controller (140 in FIG. 2). In the test mode of the source driver 300, the gamma amplifiers (423*a*, . . . , 423*u*) may be turned off based on the gamma control signal EG.

In the test mode of the source driver 300, the gamma switches 430 may output the plurality of gamma voltages (VG0, VG1, . . . , VGh) of a maximum gamma voltage GTOP level and a minimum gamma voltage GBOT level based on the gamma switch control signal GEN or the inverted gamma switch control signal /GEN. In the test mode of the source driver 300, the gamma switches 430 may alternately operate based on the gamma switch control signal GEN or the inverted gamma switch control signal /GEN. For example, when the gamma switch control signal GEN at the enable level is transmitted from the driving controller 140, that is, when the inverted gamma switch control signal /GEN is at the disabled level, the gamma voltage generator 400 may output the plurality of gamma voltages (VG0, VG1, . . . , VGh) at the maximum gamma voltage GTOP level. When the inverted gamma switch control signal /GEN at the enable level is transmitted from the driving controller 140, that is, when the gamma switch control signal GEN is at the disabled level, the gamma voltage generator 400 may output the plurality of gamma voltages (VG0, VG1, . . . , VGh) at the minimum gamma voltage GBOT level. The gamma voltages (VG0, VG1, . . . , VGh) may be provided to the decoders (333*a*, . . . , 333*j*).

In the test mode of the source driver 300, while the logic (310 in FIG. 3) outputs the image data (LD1 in FIG. 3), the gamma switch control signal GEN may repeat the enable level and the disable level. In the test mode of the source driver 300, while the logic 310 outputs the image data LD1, the gamma voltage generator 400 may repeatedly output the plurality of gamma voltages (VG0, VG1, . . . , VGh) at the maximum gamma voltage GTOP level and the minimum gamma voltage GBOT level.

The gamma voltage generator 400 includes the reference voltage block 410. The reference voltage block 410 includes a reference voltage amplifier 411. The reference voltage amplifier 411 may be connected to any gamma decoder (for example, 422*a*) among the gamma decoders (422*a*, . . . , 422*u*). Alternatively, the reference voltage block 410 may further include a separate decoder (not shown) connected to the reference voltage amplifier 411. In the test mode of the source driver 300, the magnitude of the reference voltage Vref outputted by the reference voltage amplifier 411 may be determined by the gamma selection signal based on the gamma register setting. In some implementations, the driving controller 140 may include a plurality of gamma registers and output a value stored in one of the plurality of gamma registers to the gamma voltage generator 400 as a gamma selection signal. In the test mode of the source driver 300, the driving controller 140 may change the magnitude of the reference voltage Vref by changing the gamma selection signal applied to the gamma decoder 422*a* connected to the reference voltage amplifier 411 based on values stored in the plurality of gamma registers. The reference voltage Vref may swing between a voltage level lower than the maximum gamma voltage GTOP level and a voltage level higher than the minimum gamma voltage GBOT level.

Figure 5:
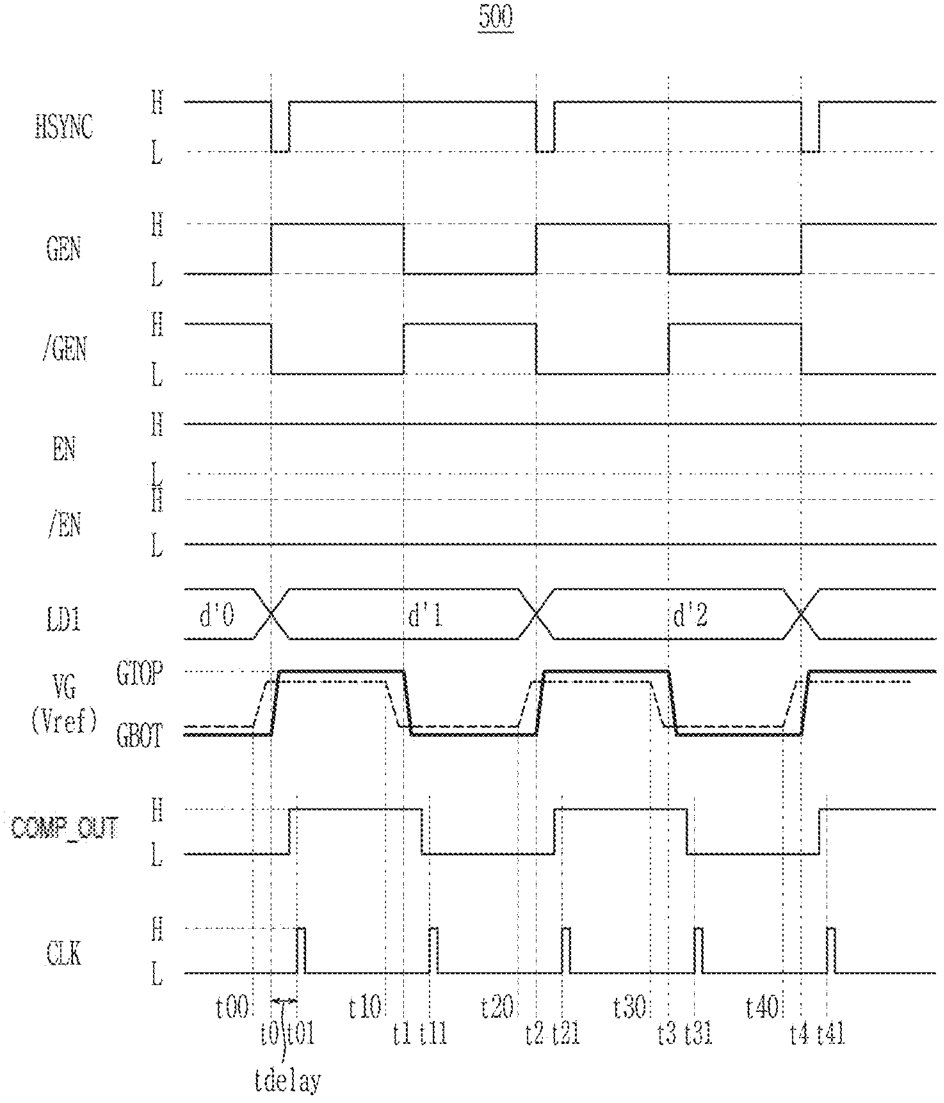
FIG. 5 illustrates a timing diagram of signals inputted and outputted to a driving controller and a source driver according to some implementations.

FIG. 5 illustrates a timing diagram of signals inputted and outputted to a driving controller and a source driver according to some implementations. Specifically, when the source driver operates in the test mode by the mode signal MS transmitted from the host processor, it illustrates signals inputted to and outputted from the driving controller and source driver.

Referring to FIG. 5, at a time point t0, when the horizontal synchronization signal HSYNC transitions to a disable level "L", the sampled image data LD1 may be transmitted to the source block 330*a*. The image data LD1 includes a plurality of bits (d'0, d'1, . . . ). Each of the PLURALITY of bits (d'0, d'1, . . . ) may be transmitted to the source block 330*a* based on the horizontal synchronization signal HSYNC.

In the test mode of the source driver 300, the switch control signal EN may be at an enable level "H", and the inverted switch control signal /EN may be at the disable level "L". By the switch control signal EN of the enable level "H" and the inverted switch control signal /EN of the disable level "L", the first switch SW1_1 and the third switch SW_3 of the source driver 300 may be closed, and the second switch SW_2 may be opened. The comparator (335*a* in FIG. 3) may output the output signal COMP_OUT by the switch control signal EN of the enable level "H" and the inverted switch control signal /EN of the disable level "L". Here, the gamma voltage VG may refer to a plurality of gamma voltages (VG0, VG1, . . . , VGh) transmitted from the gamma voltage generator 321 to the source block 330*a*.

In the test mode of the source driver 300, based on the horizontal synchronization signal HSYNC, the gamma switch control signal GEN may transition to the enable level "H" or to the disable level "L". Based on the horizontal synchronization signal HSYNC, the inverted gamma switch control signal /GEN may transition to the disable level "L" or to the enable level "H". During one cycle of the gamma switch control signal GEN, each of the plurality of bits (d'0, d'1, . . . ) may be transmitted to the source block 330*a*.

At the time point t0, when the gamma switch control signal GEN transitions to the enable level "H", the gamma voltage VG may transition to the maximum gamma voltage GTOP level. At a time point t1, when the gamma switch control signal GEN transitions to the disable level "L" and the inverted gamma switch control signal /GEN transitions to the enable level "H", the gamma voltage VG may transition to the minimum gamma voltage GBOT level.

At a time point t00, the gamma reference voltage Vref may rise to a lower voltage level than the maximum gamma voltage GTOP, and at a time point t10, the gamma reference voltage Vref may fall to a higher voltage level than the minimum gamma voltage GBOT. The magnitude of the gamma reference voltage Vref may be determined based on the gamma register setting or the like. Here, each of the time point t00 and the time point t10 may be a time point at which an arbitrary value is inputted to the gamma register. The time when the gamma reference voltage Vref rises to a voltage level lower than the maximum gamma voltage GTOP or falls to a voltage level higher than the minimum gamma voltage GBOT may be a time point preceding the time when the gamma switch control signal GEN transitions to the enable level "H" or the disable level "L" by a predetermined time.

In the test mode of the source driver 300, the comparator 335*a* in the source block 330*a* may compare the gamma voltage VG, which is an output voltage of the decoder 333*a*, and the reference voltage Vref, and output a comparison result. Hereinafter, for better understanding and ease of description, the comparison result of the comparator 335*a* is referred to as the output signal COMP_OUT. The output signal COMP_OUT may output a signal at the enable level "H" when the voltage level of the gamma voltage VG is higher than the voltage level of the reference voltage Vref, and may output a signal at the disable level "L" when the voltage level of the gamma voltage VG is lower than the voltage level of the reference voltage Vref. In a period from t0 to t1, since the voltage level of the gamma voltage VG is higher than the voltage level of the reference voltage Vref, the comparator 335*a* may output the output signal COMP_OUT at the enable level "H". In a period from t1 to t2, since the voltage level of the gamma voltage VG is lower than the voltage level of the reference voltage Vref, the comparator 335*a* may output the output signal COMP_OUT at the disable level "L".

In the test mode of the source driver 300, the logic 310 of the source driver 330 may receive the second clock signal CLK from the driving controller (140 in FIG. 2). The logic 310 may determine a defect in the source block 330*a* based on the second clock signal CLK and the output signal COMP_OUT. The second clock signal CLK may be enabled at a time point t01 delayed by a predetermined time ($t_{delay}$) from the time point t0 at which the horizontal synchronization signal HSYNC is enabled. The time points (t01, t11, t21, . . . ) when the second clock signal CLK is enabled may be the time point to determine whether the source block 330*a* is defective based on the output signal COMP_OUT of the comparator 335*a*. Specifically, the logic 310 of the source driver 330 may determine whether the source block 330*a* is defective based on the output signal COMP_OUT at the time points (t01, t11, t21, . . . ) when the second clock signal CLK is enabled.

In the test mode of the source driver 300, the logic 310 may determine whether the source block 330*a* is defective based on the output signal COMP_OUT. Specifically, the logic 310 may predict the voltage level of the output signal COMP_OUT based on the gamma switch control signal GEN and the inverted gamma switch control signal /GEN. Alternatively, the logic 310 may predict the voltage level of the output signal COMP_OUT based on the voltage level of the gamma voltage VG. The logic 310 may determine whether the source block 330*a* is defective by comparing the predicted voltage level of the output signal COMP_OUT with the voltage level of the actual output signal COMP_OUT. For example, when the gamma switch control signal GEN is the enable level "H", the gamma voltage generator 400 outputs the gamma voltage VG of the maximum gamma voltage GTOP level, so that the logic 310 may predict the voltage level of the output signal COMP_OUT to be the enable level "H". That is, the predicted voltage level of the output signal COMP_OUT of the logic 310 may be the enable level "H". Accordingly, the logic 310 may determine that there is no defect in the source block 330*a* when the voltage level of the output signal COMP_OUT is the enable level "H", and that there is a defect in the source block 330*a* when the voltage level of the output signal COMP_OUT is the disable level "L". Alternatively, when the inverted gamma switch control signal /GEN is the enable level "H", the gamma voltage generator 400 outputs the gamma voltage VG of the minimum gamma voltage GBOT level, so that the logic 310 may predict the voltage level of the output signal COMP_OUT to be the disable level "L". That is, the predicted voltage level of the output signal COMP_OUT of the logic 310 may be the disable level "L". Accordingly, the logic 310 may determine that there is no defect in the source block 330*a* when the voltage level of the output signal COMP_OUT is the disable level "L", and that there is a defect in the source block 330*a* when the voltage level of the output signal COMP_OUT is the enable level "H". According to some implementations, the logic 310 may determine whether the source block 330*a* is defective based on the predicted voltage level of the output signal of the comparator and the actual voltage level of the output signal. Here, the description is based on one source block 330*a*, but the same image data LD1 may be applied to all source blocks (330*a*, . . . , 330*j*) in the source driver 300, and the logic 310 may simultaneously receive the output signals (COMP_OUT1, . . . , COMP_OUTj) according to the image data LD1 from all the source blocks (330*a*, . . . , 330*j*). According to some implementations, there is an advantage in that test time may be reduced by simultaneously performing tests on all the source blocks (330*a*, . . . , 330*j*).

Figure 6:
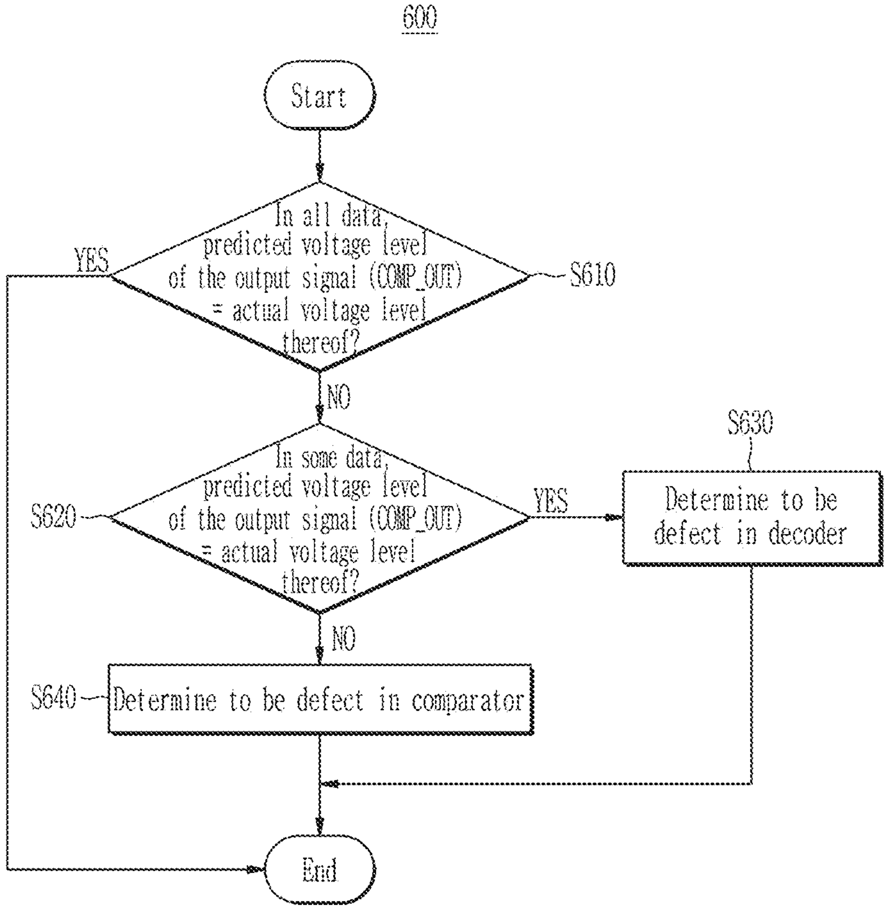
FIG. 6 illustrates a flowchart of an operation method of a source driver according to some implementations.
Figure 7:
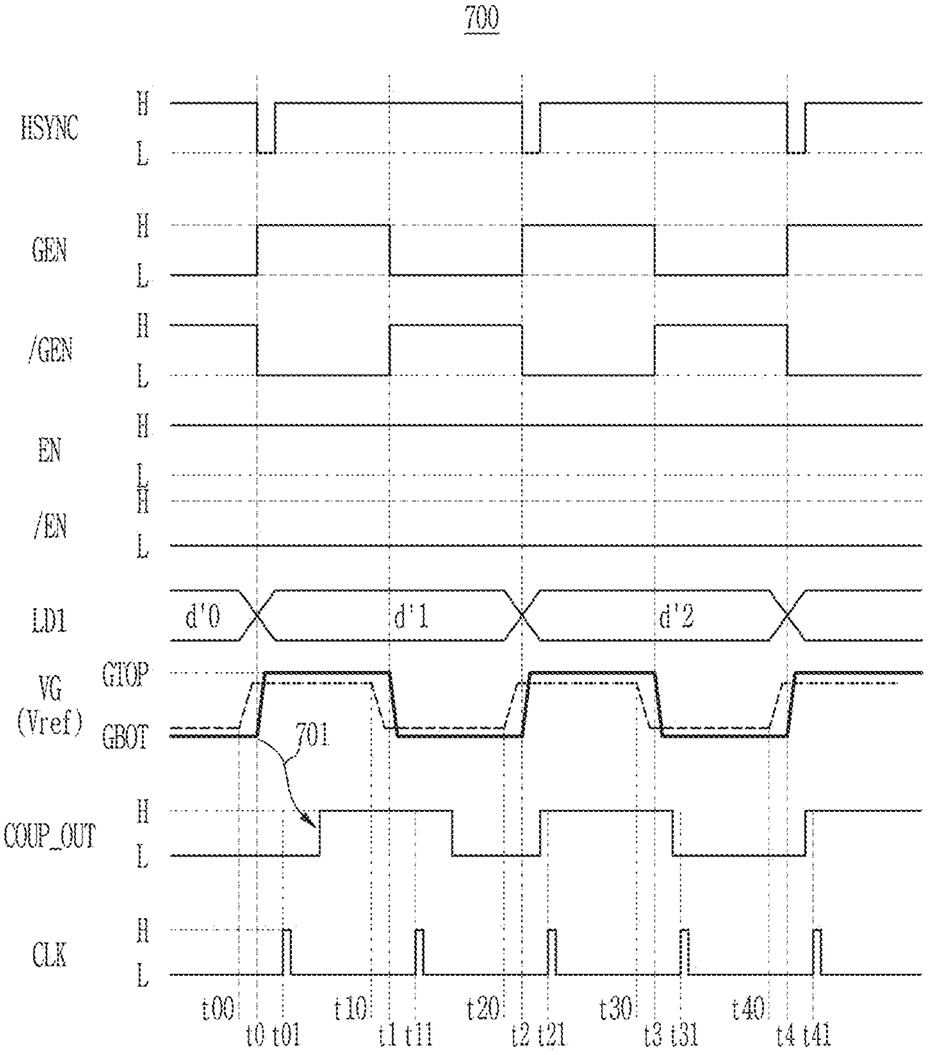
FIG. 7 illustrates a timing diagram for explaining an operation method of a source driver according to some implementations.
Figure 8:
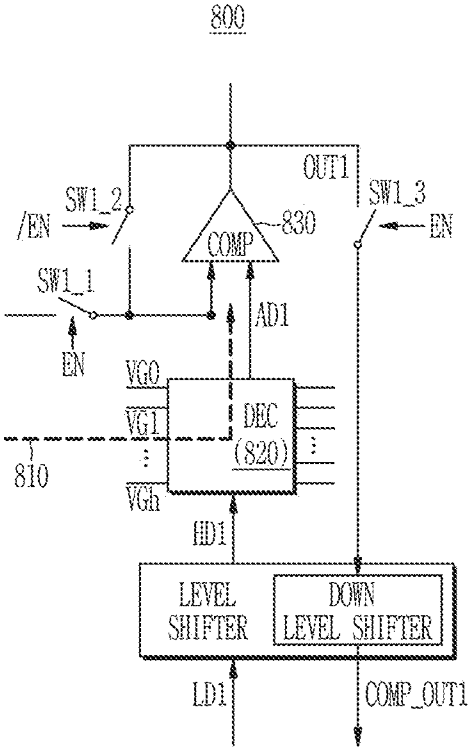
FIG. 8 illustrates a block diagram for explaining an operation method of a source driver according to some implementations.
Figure 9:
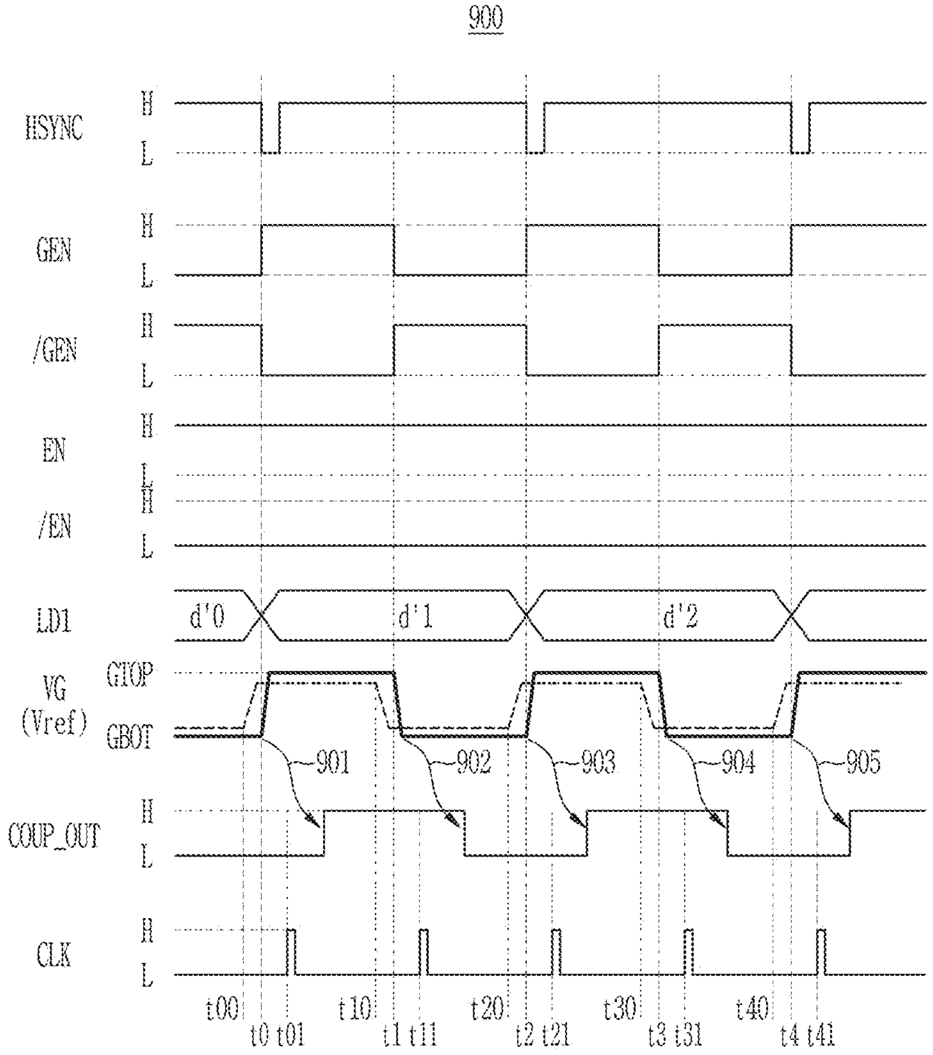
FIG. 9 illustrates a timing diagram for explaining an operation method of a source driver according to some implementations.

FIG. 6 illustrates a flowchart of an operation method of a source driver according to some implementations, FIG. 7 and FIG. 9 illustrate timing diagrams for explaining an operation method of a source driver according to some implementations, and FIG. 8 illustrates a block diagram for explaining an operation method of a source driver according to some implementations.

Specifically, these are diagrams illustrating a method of analyzing the cause when a defect exists in the source block 330*a*.

In some implementations, the logic 310 of the source driver 300 may determine whether the voltage level of the output signal COMP_OUT is equal to the predicted voltage level in the time period of all data of the source block 330*a* (S610). Here, the time period of all data may be all periods in which the source block 330*a* receives each bit included in the image data LD1. In some implementations, when there is a time period in which the voltage level of the output signal COMP_OUT and the predicted voltage level are not equal, the logic 310 may determine whether the corresponding time period is a time period of some data or all data (S620). Depending on whether or not a period in which the voltage level of the output signal COMP_OUT does not match the predicted voltage level corresponds to a time period of some data, the logic 310 may determine in which portion of the source block the defect of the source block has occurred.

FIG. 7 is a timing diagram for explaining some implementations in which the voltage level of the output signal COMP_OUT and the predicted voltage level are not equal in the time period of some data, and FIG. 9 is a timing diagram for explaining some implementations in which the voltage level of the output signal COMP_OUT and the predicted voltage level are not equal in the time period of all data.

Referring to FIG. 7, the logic 310 of the source driver 300 may receive the output signal COMP_OUT from the source block 330*a* for a plurality of time periods (t0 to t1, t1 to t2, . . . ) based on the plurality of data bits (d'0, d'1, . . . ), and determine whether the source block is defective based on the output signal COMP_OUT.

Referring to the period from t0 to t1, since the gamma control signal GEN is the enable level "H", the logic 310 of the source driver 300 may predict the output signal COMP_OUT of the enable level "H" at the rising time point t01 of the second clock signal CLK. However, when a defect exists in the source block 330*a*, the output signal COMP_OUT may transition to the enable level "H" at a time point delayed by a predetermined time 701 from the first time point t01. Since the logic 310 determines whether the source block 330*a* is defective based on the time point t01 at which the second clock signal CLK is enabled, at period from t0 to t1, it may be determined that the output signal COMP_OUT outputs a voltage level "L" that is different from the predicted voltage level "H", and it may be determined that a defect exists in the source block 330*a*.

However, referring to the period from t2 to t3, the output signal COMP_OUT may be the enable level "H" at the rising time point t21 of the second clock signal CLK when the gamma control signal GEN is the enable level "H". In addition, referring to the period from t3 to t4, the output signal COMP_OUT may be the disable level "L" at the rising time point t31 of the second clock signal CLK when the gamma control signal GEN is the disable level "L". That is, the logic 310 may determine that a time period in which the voltage level of the output signal COMP_OUT and the predicted voltage level are not equal is the time periods (t0 to t1 and t1 to t2) of some data among the time periods of the plurality of data.

In some implementations, when the voltage level of the output signal COMP_OUT and the predicted voltage level are not equal in the time period of some data, the logic 310 may determine that the defect of the source block 330*a* is due to a defect of the decoder (S630).

Referring to FIG. 8, a source block 800 may receive a plurality of gamma voltages (VG0, . . . , VGh) from an external gamma voltage generator, and output the gamma voltage VG of the maximum gamma voltage GTOP level or minimum gamma voltage GBOT level through a decoder 820. The decoder 820 may select at least one gamma voltage VG among the plurality of gamma voltage (VG0, . . . , VGh) based on the decode image data HD1. That is, the decoder 820 may include a plurality of paths allocated to each of the plurality of gamma voltages (VG0, . . . , VGh) and the decode image data HD1 in order to output the gamma voltage VG selected based on the decode image data HD1.

However, when a defect occurs in some path 810 in the decoder 820, the gamma voltage VG outputted based on the data allocated to the corresponding path 810 may have an abnormal value. For example, the gamma voltage VG outputted through the corresponding path 810 may have an excessively increased slope or may be at a level different from the predicted voltage level.

Therefore, when the voltage level of the output signal COMP_OUT and the predicted voltage level are not equal only in the time period of some data among the plurality of time periods, the logic 310 may determine that the defect of the source block 800 is due to the defect of decoder 820.

In some implementations, the voltage level of the output signal COMP_OUT and the predicted voltage level may not be equal in the time periods of all data. When the voltage level of the output signal COMP_OUT and the predicted voltage level are not equal in the time period of all the data, the logic 310 may determine that the defect of the source block 330*a* is due to a defect of the comparator (S640).

Referring to FIG. 9, at the time periods (t0 to t1, t1 to t2, . . . ) of all data, the output signal COMP_OUT may transition to the enable level "H" or the disable level "L" at time points delayed by predetermined times (901, 902, . . . , 905) from the rising time points (t0, t1, . . . , t4) of the gamma voltage VG. Then, the predicted voltage level of the output signal COMP_OUT and the actual voltage level may not be equal in all time periods based on the time points (t01, t11, . . . , t41) when the second clock signal CLK is enabled.

As described above, since the gamma voltage VG outputted from the decoder (820 in FIG. 8) of the source block (800 in FIG. 8) is all inputted to the comparator 830, when there is a defect in the comparator 830, the abnormal output signal COMP_OUT may be outputted in the time period of all data.

Therefore, when the voltage level of the output signal COMP_OUT and the predicted voltage level are not equal in the time period of all data, the logic 310 may determine that the defect of the source block 800 is due to the defect of the comparator 830.

Figure 10:
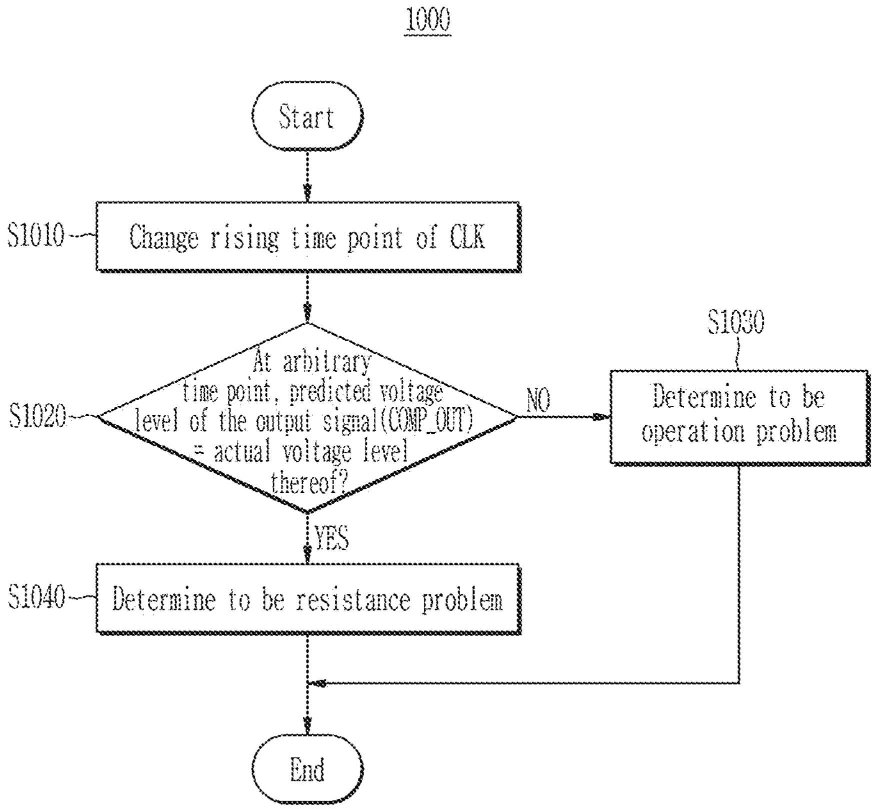
FIG. 10 illustrates a flowchart of an operation method of a source driver according to some implementations.
Figure 11:
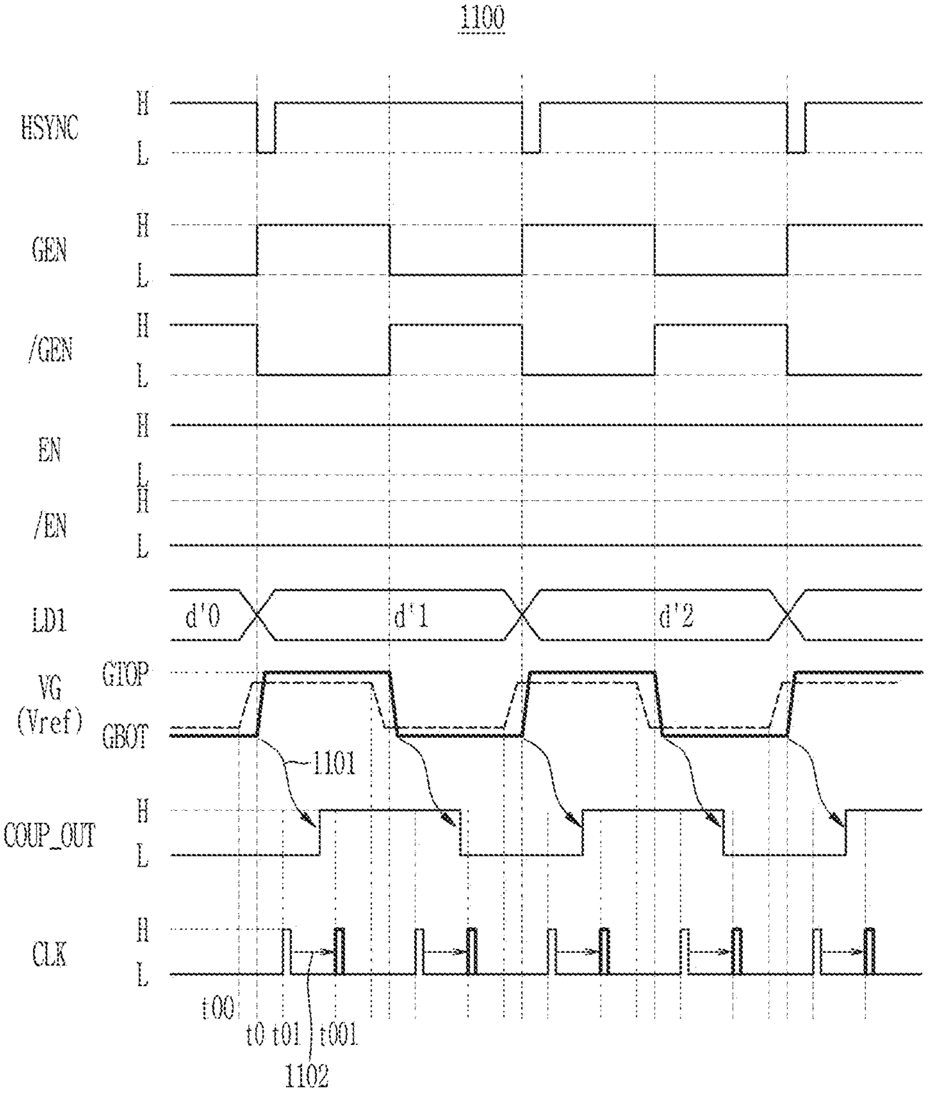
FIG. 11 illustrates a timing diagram for explaining an operation method of a source driver according to some implementations.
Figure 12:
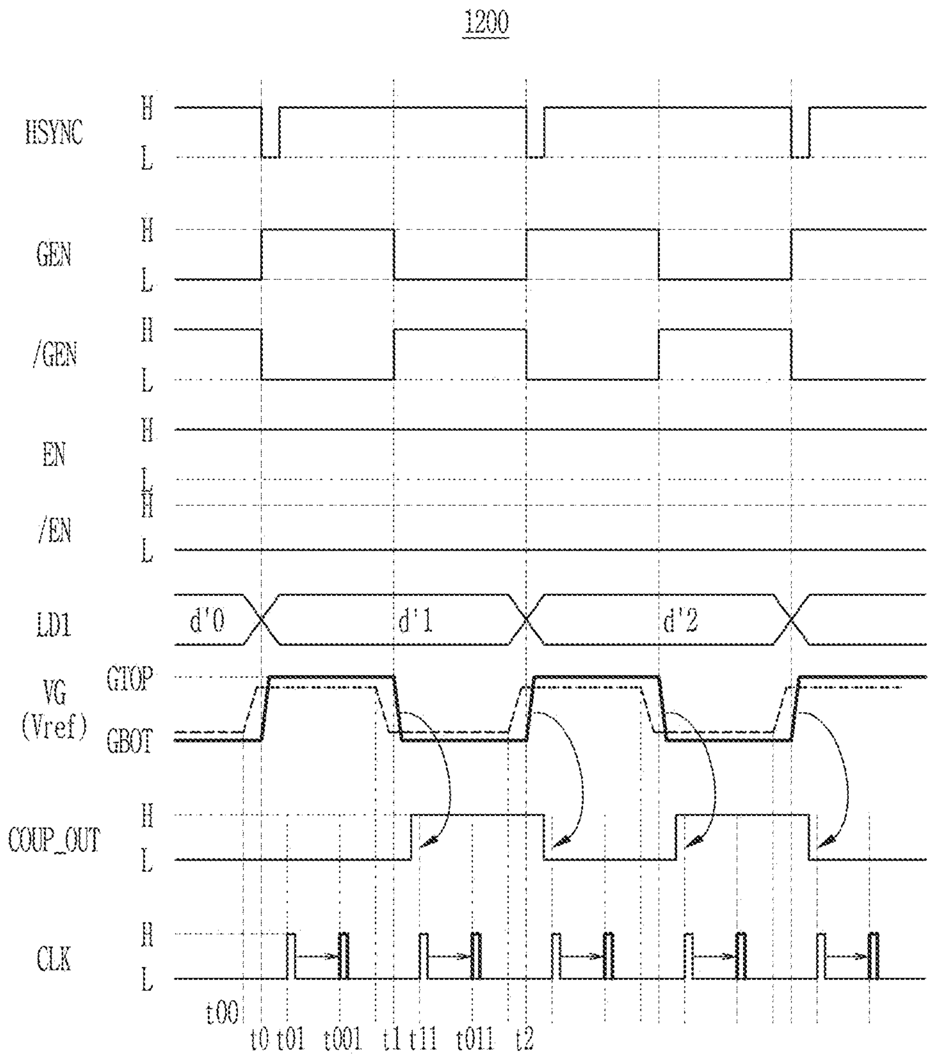
FIG. 12 illustrates a timing diagram for explaining an operation method of a source driver according to some implementations.

FIG. 10 illustrates a flowchart of an operation method of a source driver according to some implementations, and FIG. 11 and FIG. 12 illustrate timing diagrams for explaining an operation method of a source driver according to some implementations.

Specifically, FIG. 10 to FIG. 12 are diagrams for explaining a method of determining, when the logic determines that a defect exists in the source block, whether the defect is a resistance problem or an operation problem.

In some implementations, when it is determined that a defect exists in the source block, the logic 310 may change the rising time point of the second clock signal CLK (S1010).

In some implementations, the voltage level of the output signal COMP_OUT and the predicted voltage level may not be equal in the time period of all data of the source block 330*a* in the source driver 300. In some other implementations, the voltage level of the output signals (COMP_OUT1, . . . , COMP_OUTj) and the predicted voltage level may not be equal in the time period of all data of all the source blocks (330*a*, . . . , 330*j*) (see FIG. 3) included in the source driver 300. In the following, the two cases will be separately described.

Referring to FIG. 11, since the voltage level of the output signal COMP_OUT and the predicted voltage level are not equal in the time period of all data of the source block 330*a*, the logic 310 may determine that the defect of the source block 330*a* is a defect of the comparator.

In some implementations, the logic 310 may receive a third clock signal NCLK whose enable time point has been changed from the driving controller 140 (see FIG. 2) to determine whether the defect of the source block 330*a* is a resistance problem of the comparator. The third clock signal NCLK received from the driving controller 140 may be a signal whose rising time point is changed from the first time point t01 to the second time point t001. The second time point t001 may be a time point delayed by an arbitrary time 1102 from the first time point t01. In addition, the second time point t001 may be any time point within the corresponding data period (for example, t0 to t1).

In some implementations, the logic 310 may detect the voltage level of the output signal COMP_OUT at the rising time point t001 of the third clock signal NCLK. The logic 310 may compare the voltage level of the output signal COMP_OUT and the predicted voltage level at the rising time point t001 of the third clock signal NCLK. The logic 310 may determine that the voltage level "H" of the output signal COMP_OUT and the predicted voltage level "H" are the same at the rising time point t001 of the third clock signal NCLK.

In some implementations, at the enable time point t001 of the changed clock signal NCLK, when the voltage level of the output signal COMP_OUT is the same as the predicted voltage level, the logic 310 may determine that the defect of the source block 330*a* is a resistance problem of the comparator or decoder (S1040). For example, when the resistance problem occurs in the comparator or decoder, the output signal COMP_OUT may transition to the enable level "H" or the disable level "L" at a later time point than predicted. Accordingly, there may be a time point at which the voltage level of the output signal COMP_OUT is the same as the predicted voltage level in the time period of the corresponding data. In some implementations, at the enable time point of the changed clock signal NCLK, when the voltage level of the output signal COMP_OUT is the same as the predicted voltage level, the logic 310 may determine that the defect of the source block 330*a* is a resistance problem of the comparator or decoder.

Meanwhile, the above-described implementations are intended to explain the method of determining whether the source block 330*a* in the source driver 300 is defective. However, the source driver 300 may include a plurality of source blocks (330*a*, . . . , 330*j*), and according to some implementation, tests on all source blocks (330*a*, . . . , 330*j*) may be simultaneously performed.

In some implementations, the voltage level of the output signals (COMP_OUT1, . . . , COMP_OUTj) and the predicted voltage level may not be equal in the time period of all data of all the source blocks (330*a*, . . . , 330*j*) included in the source driver 300. Then, the logic 310 may determine that the gamma line connecting the gamma voltage generator (320 in FIG. 3) and all the source blocks (330*a*, . . . , 330*j*) is defective.

In some implementations, the logic 310 may receive the third clock signal NCLK whose enable time point is changed from the driving controller 140 to determine whether the defects of all the source blocks (330*a*, . . . , 330*j*) are a resistance problem of the gamma line. In some implementations, the logic 310 may determine that the defects of all the source blocks (330*a*, . . . , 330*j*) are due to the resistance problem of the gamma line when the voltage level of the output signals (COMP_OUT1, . . . , COMP_OUTj) is the same as the predicted voltage level at the enable time point t001 of the third clock signal NCLK.

In some implementations, since the voltage level of the output signal COMP_OUT and the predicted voltage level are not equal in the time period of all the data of the source block 330*a*, the source driver 300 may receive the third clock signal NCLK whose enable time point is changed from the driving controller 140. However, there may not be a time point at which the voltage level of the output signal COMP_OUT is the same as the predicted voltage level in the time period of all data. In some implementations, when the logic 310 determines that there is no time point at which the voltage level of the output signal COMP_OUT is the same as the predicted voltage level in the time period of all data, it may be determined that the defect of the source block 330*a* is a function problem of the comparator or decoder (S1030). This will be described in detail with reference to FIG. 12.

Referring to FIG. 12, in the period from t0 to t1, since the gamma control signal GEN is at the enable level "H", the logic 310 may predict the output signal COMP_OUT of the enable level "H" at the rising time point t01 of the clock signal CLK. In addition, in the period from t1 to t2, since the gamma control signal GEN is at the disable level "L", the logic 310 may predict the output signal COMP_OUT of the disable level "L" at the rising time point t11 of the clock signal CLK. However, due to the defect of the comparator, the output signal COMP_OUT may output the predicted voltage level and the inverted voltage level in all data periods. For example, when an operation defect exists in the comparator or decoder, the output signal COMP_OUT may output the predicted voltage level and the inverted voltage level in all data periods. That is, in the period from t0 to t1, the voltage level of the output signal COMP_OUT may be the disabled level "L", and in the period from t1 to t2, the voltage level of the output signal COMP_OUT may be the enable level "H".

In some implementations, the logic 310 may change the rising time point from the driving controller 140 to a random time point t001 within the period from t0 to t1, and receive the third clock signal NCLK whose rising time point is changed to the random time point t011 within the period from t1 to t2. The logic 310 may detect the voltage level of the output signal COMP_OUT at the rising time points t001 and t011 of the third clock signal NCLK. However, the logic 310 may determine that there is no time point at which the voltage level of the output signal COMP_OUT is the same as the predicted voltage level in the time period of all data. Accordingly, the logic 310 may determine that the defect in the source block 330*a* is an operation problem of the comparator.

As described above, the source driver according to some implementations has the advantage of being able to detect the defect in the source block and simultaneously analyze the cause of the defect in the source block.

Figure 13:
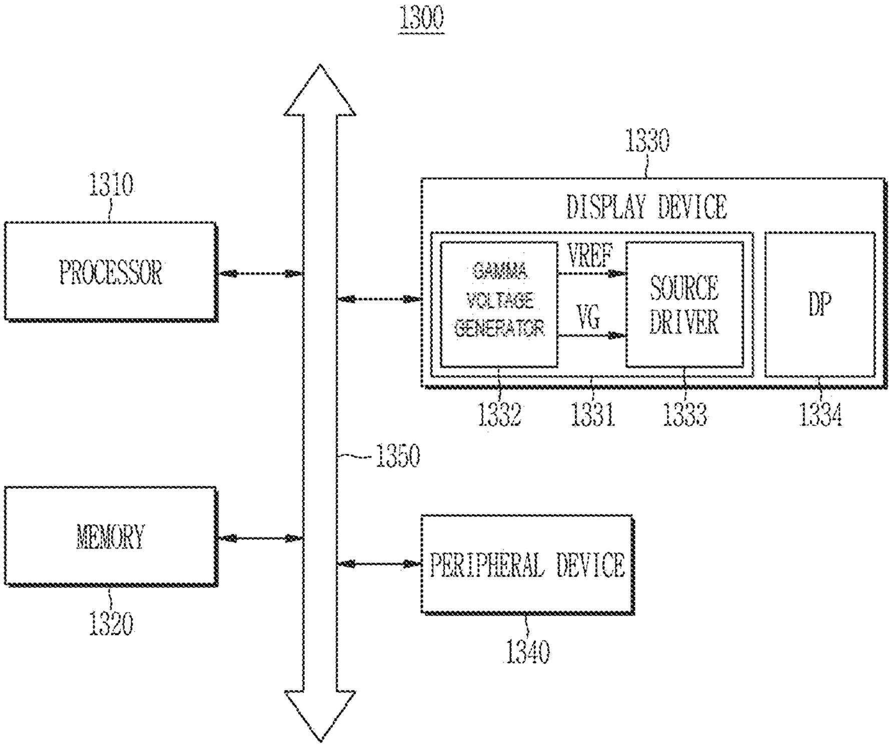
FIG. 13 is a block diagram of a display system according to some implementations.

FIG. 13 is a block diagram of a display system according to some implementations.

Referring to FIG. 13, a display system 1300 according to some implementations includes a processor 1310, a memory 1320, a display device 1330, and a peripheral device 1340 that are electrically connected to a system bus 1350.

The processor 1310 controls input and output of data of the memory 1320, the display device 1330, and the peripheral device 1340, and may perform image processing of image data transmitted between the corresponding devices.

The memory 1320 may include a volatile memory such as a dynamic random access memory (DRAM) and/or a non-volatile memory such as a flash memory. The memory 1020 may be configured with a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (for example, a memory in which a static random access memory (SRAM) buffer, a NAND flash memory, and NOR interface logic are combined). The memory 1020 may store image data obtained from the peripheral device 1040 or an image signal processed by the processor 1010.

The display device 1330 includes a driving circuit 1331 and a display panel 1334, and the driving circuit 1331 may display image data applied through the system bus 1350 on the display panel 1334. The driving circuit 1331 includes a gamma voltage generator 1332 and a source driver 1333. In some implementations, the source driver 1333 may receive a reference voltage VREF and a gamma voltage VG from the gamma voltage generator 1332, and the driving circuit 1331 may determine whether the source driver 1333 is defective based on a comparison result between the reference voltage VREF and the gamma voltage VG. The gamma voltage generator 1332 and the source driver 1333 may be the gamma voltage generator and the source driver described with reference to FIG. 1 to FIG. 12.

The peripheral device 1240 may be a device that converts a moving image or a still image captured by a camera, a scanner, or a webcam into an electrical signal. Image data obtained through the peripheral device 1240 may be stored in the memory 120, or may be displayed on the panel 1334 in real time.

The display system 1300 may be provided in a mobile electronic product, such as a smart phone, but is not limited thereto, and may be provided in various electronic products that display images.

In some implementations, each constituent element or a combination of two or more constituent elements described with reference to FIG. 1 to FIG. 13 may be implemented as a digital circuit, a programmable or non-programmable logic device or array, an application specific integrated circuit (ASIC), or the like.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been described in connection with what is presently considered to be practical implementations, it is to be understood that the disclosure is not limited to the disclosed implementations, but, on the contrary, is intended to cover various modifications and equivalent arrangements included within the spirit and scope of the appended claims.

What is claimed is:

1. A display driving integrated circuit comprising:

a gamma voltage generator configured to in a first mode, output a plurality of gamma voltages at a plurality of voltage levels, in a second mode, output the plurality of gamma voltages at a first voltage level among the plurality of voltage levels based on a first control signal in a plurality of first time periods among a plurality of time periods, in the second mode, output the plurality of gamma voltages at a second voltage level among the plurality of voltage levels based on a second control signal in time periods other than the plurality of first time periods among the plurality of time periods, and in the second mode, output a reference voltage that swings between a third voltage level lower than the first voltage level and a fourth voltage level higher than the second voltage level in the plurality of time periods; and a source block circuit configured to in the first mode, amplify the plurality of gamma voltages, in the second mode, receive input data in response to a first clock signal in the plurality of first time periods, in the second mode, select a first gamma voltage among the plurality of gamma voltages of the first voltage level based on the input data, and in the second mode, compare the first gamma voltage and the reference voltage.

2. The display driving integrated circuit of claim 1, further comprising a plurality of registers configured to receive an output signal as a result of the comparison between the first gamma voltage and the reference voltage, and detect a voltage level of the output signal based on a second clock signal that is different from the first clock signal.

3. The display driving integrated circuit of claim 2, wherein the plurality of registers are configured to determine a predicted voltage level of the output signal based on the first control signal and the second control signal, and determine whether the source block circuit is defective based on the predicted voltage level and the voltage level of the output signal when the second clock signal transitions to a first level.

4. The display driving integrated circuit of claim 3, wherein the second clock signal transitions to the first voltage level at a time point delayed by a predetermined time from a time point when the first clock signal transitions to the first voltage level.

5. The display driving integrated circuit of claim 3, wherein subsequent to determining that the source block circuit is defective, the plurality of registers are configured to further detect the voltage level of the output signal at a time point delayed by a predetermined time from the time point when the second clock signal transitions to the first voltage level.

6. The display driving integrated circuit of claim 2, wherein the source block circuit includes a decoder configured to select the first gamma voltage of the plurality of gamma voltages based on the input data, a comparator configured to compare the first gamma voltage and the reference voltage to output a first signal, and a level shifter configured to level-shift the first signal to generate the output signal.

7. The display driving integrated circuit of claim 6, wherein the source block circuit further includes a first switch connecting the comparator and the gamma voltage generator, a second switch connecting an output terminal of the comparator and an input terminal of the comparator, and a third switch connecting the comparator and the level shifter.

8. The display driving integrated circuit of claim 7, wherein in the plurality of first time periods and the time periods other than the plurality of first time periods among the plurality of time periods, the first switch and the third switch are closed and the second switch is opened.

9. The display driving integrated circuit of claim 1, wherein the gamma voltage generator includes a first resistor string configured to generate the plurality of gamma voltages, a first plurality of switches connected between a first line of the first voltage level and the first resistor string, and a second plurality of switches connected between a second line of the second voltage level and the first resistor string.

10. The display driving integrated circuit of claim 9, wherein the gamma voltage generator further includes a second resistor string configured to divide a first voltage of the first voltage level and a second voltage of the second voltage level to generate a plurality of reference gamma voltages;

a plurality of gamma decoders configured to output the plurality of reference gamma voltages, respectively; and a plurality of gamma amplifiers configured to receive the plurality of reference gamma voltages respectively from the plurality of gamma decoders, wherein the plurality of gamma amplifiers are connected to the first resistor string, and are disabled in the plurality of first time periods and the time periods other than the plurality of first time periods among the plurality of time periods.

11. The display driving integrated circuit of claim 10, wherein the gamma voltage generator further includes a reference voltage amplifier configured to receive one of the plurality of reference gamma voltages from a first gamma decoder of the plurality of gamma decoders and output the reference voltage.

12. The display driving integrated circuit of claim 9, wherein the first plurality of switches are configured to close based on the first control signal, the second plurality of switches are configured to close based on the second control signal, and the first control signal and the second control signal are inverted with respect to each other.

13. A source driver comprising:

a decoder configured to select a first gamma voltage of a first plurality of gamma voltages based on input data in a first mode and select a second gamma voltage of a second plurality of gamma voltages based on input data in a second mode;

a comparator configured to amplify the first gamma voltage in the first mode to generate a data signal corresponding to the input data, and compare the second gamma voltage and a reference voltage in the second mode to generate a comparison signal; and a level shifter configured to shift a level of the comparison signal in the second mode to generate an output signal.

14. The source driver of claim 13, wherein a voltage level of the second plurality of gamma voltages is a first level or a second level different from the first level.

15. The source driver of claim 14, wherein the reference voltage swings between a third level lower than the first level and a fourth level higher than the second level.

16. The source driver of claim 13, further comprising a plurality of registers configured to output the input data based on a first clock signal in the first mode and detect a voltage level of the output signal based on a second clock signal that is different from the first clock signal in the second mode.

17. The source driver of claim 16, wherein the second clock signal transitions to an enable level at a time point delayed by a predetermined time from a time point when the first clock signal transitions to the enable level.

18. A display driving integrated circuit comprising:

a source block circuit configured to receive a plurality of gamma voltages at a maximum gamma voltage level in a first time period, receive input data based on a first clock signal, select a first gamma voltage of the plurality of gamma voltages at the maximum gamma voltage level based on the input data, compare the first gamma voltage and a reference voltage to generate a first output signal, receive a plurality of gamma voltages at a minimum gamma voltage level in a second time period, select a second gamma voltage of the plurality of gamma voltages at the minimum gamma voltage level based on the input data, and compare the second gamma voltage and the reference voltage to generate a second output signal;

a plurality of registers configured to receive the first output signal and the second output signal, detect a voltage level of the first output signal based on a second clock signal that is different from the first clock signal in the first time period, and detect a voltage level of the second output signal based on the second clock signal in the second time period; and a driving controller configured to output the first clock signal and the second clock signal.

19. The display driving integrated circuit of claim 18, wherein the plurality of registers are configured to predict the voltage level of the first output signal based on the plurality of gamma voltages at the maximum gamma voltage level in the first time period, and determine whether the source block circuit is defective based on the predicted voltage level of the first output signal and the detected voltage level of the first output signal.

20. The display driving integrated circuit of claim 19, wherein when it is determined that the source block circuit is defective, the plurality of registers are configured to further receive a third clock signal different from the second clock signal from the driving controller.

* * * * *